US011325353B2

(12) United States Patent
Klein

(10) Patent No.: US 11,325,353 B2
(45) Date of Patent: May 10, 2022

(54) COMPOSITE PANE WITH AN ELECTRICAL LOAD

(71) Applicant: SAINT-GOBAIN GLASS FRANCE, Courbevoie (FR)

(72) Inventor: Marcel Klein, Baesweiler (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 227 days.

(21) Appl. No.: 16/492,854

(22) PCT Filed: Feb. 20, 2018

(86) PCT No.: PCT/EP2018/054055
§ 371 (c)(1),
(2) Date: Sep. 10, 2019

(87) PCT Pub. No.: WO2018/166759
PCT Pub. Date: Sep. 20, 2018

(65) Prior Publication Data
US 2021/0138766 A1 May 13, 2021

(30) Foreign Application Priority Data
Mar. 15, 2017 (EP) ..................................... 17161056

(51) Int. Cl.
*B32B 3/00* (2006.01)
*B32B 3/26* (2006.01)
(Continued)

(52) U.S. Cl.
CPC .......... *B32B 17/10495* (2013.01); *B32B 3/00* (2013.01); *B32B 3/26* (2013.01);
(Continued)

(58) Field of Classification Search
CPC ........ B32B 17/10495; B32B 17/10541; B32B 3/26; B32B 3/30; B32B 17/10036;
(Continued)

(56) References Cited

U.S. PATENT DOCUMENTS 5,099,105 A 3/1992 Goerenz et al.
5,850,070 A * 12/1998 Gillner .............. B32B 17/10761
219/203

(Continued)

FOREIGN PATENT DOCUMENTS

CN 1668461 A 9/2005
CN 101489341 A 7/2009
(Continued)

OTHER PUBLICATIONS

International Search Report as issued in International Patent Application No. PCT/EP2018/054055, dated May 11, 2018.
(Continued)

*Primary Examiner* — Joanna Pleszczynska
(74) *Attorney, Agent, or Firm* — Pillsbury Winthrop Shaw Pittman LLP

(57) ABSTRACT

A composite pane with an electrical load, includes an outer pane and an inner pane that are joined to one another via a thermoplastic intermediate layer, wherein the thermoplastic intermediate layer has a recess that has a receiving opening, the receiving opening is dimensioned such that it is designed for accommodating the electrical load in the recess, and the electrical load is arranged in the recess.

18 Claims, 7 Drawing Sheets

Figure 1:
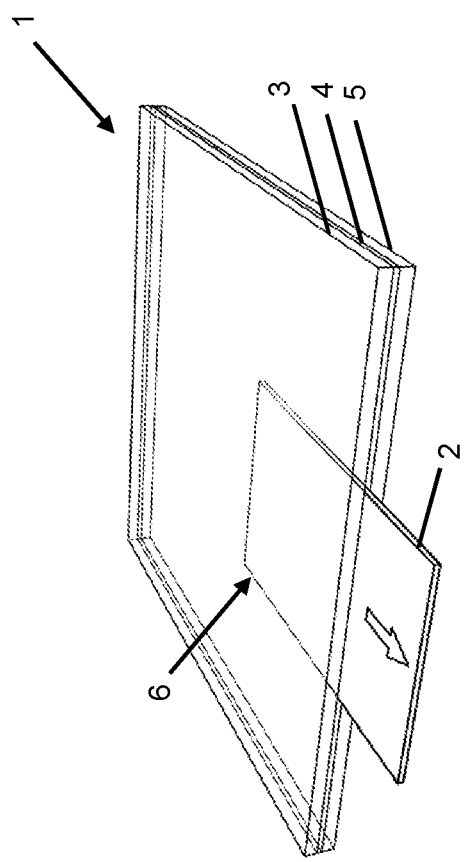

(51) Int. Cl.
      *B32B 3/30*     (2006.01)
      *B32B 17/10*    (2006.01)
      *B32B 37/14*    (2006.01)
      *B32B 38/00*    (2006.01)
      *B32B 38/10*    (2006.01)
      *H04N 7/18*     (2006.01)
      *H04N 5/77*     (2006.01)
      *B32B 27/32*    (2006.01)

(52) U.S. Cl.
      CPC .......... *B32B 3/30* (2013.01); *B32B 17/10036* (2013.01); *B32B 17/10293* (2013.01); *B32B 17/10899* (2013.01); *B32B 27/322* (2013.01); *H04N 5/77* (2013.01); *H04N 7/18* (2013.01); *B32B 2457/20* (2013.01); *B32B 2605/006* (2013.01); *Y10T 428/24298* (2015.01); *Y10T 428/24314* (2015.01)

(58) Field of Classification Search
      CPC ........ B32B 17/10293; B32B 17/10165; B32B 17/10761; Y10T 428/24314
      See application file for complete search history.

(56) References Cited

U.S. PATENT DOCUMENTS

| | | | |
|---|---|---|---|
| 2006/0174476 A1* | 8/2006 | Loibl | B32B 17/10293 29/611 |
| 2006/0275599 A1* | 12/2006 | Lefevre | B60Q 3/208 428/332 |
| 2015/0165965 A1* | 6/2015 | Masaki | B32B 17/10532 362/513 |

FOREIGN PATENT DOCUMENTS

| | | |
|---|---|---|
| DE | 10 2007 012571 A1 | 1/2008 |
| DE | 10 2008 036579 A1 | 2/2010 |
| JP | H01-090030 U | 6/1989 |
| JP | 2015-527948 A | 9/2015 |
| WO | WO 2012/031647 A1 | 3/2012 |

OTHER PUBLICATIONS

First Office Action as issued in Chinese Patent Application No. 201880000321.8, dated Jun. 30, 2021.

\* cited by examiner

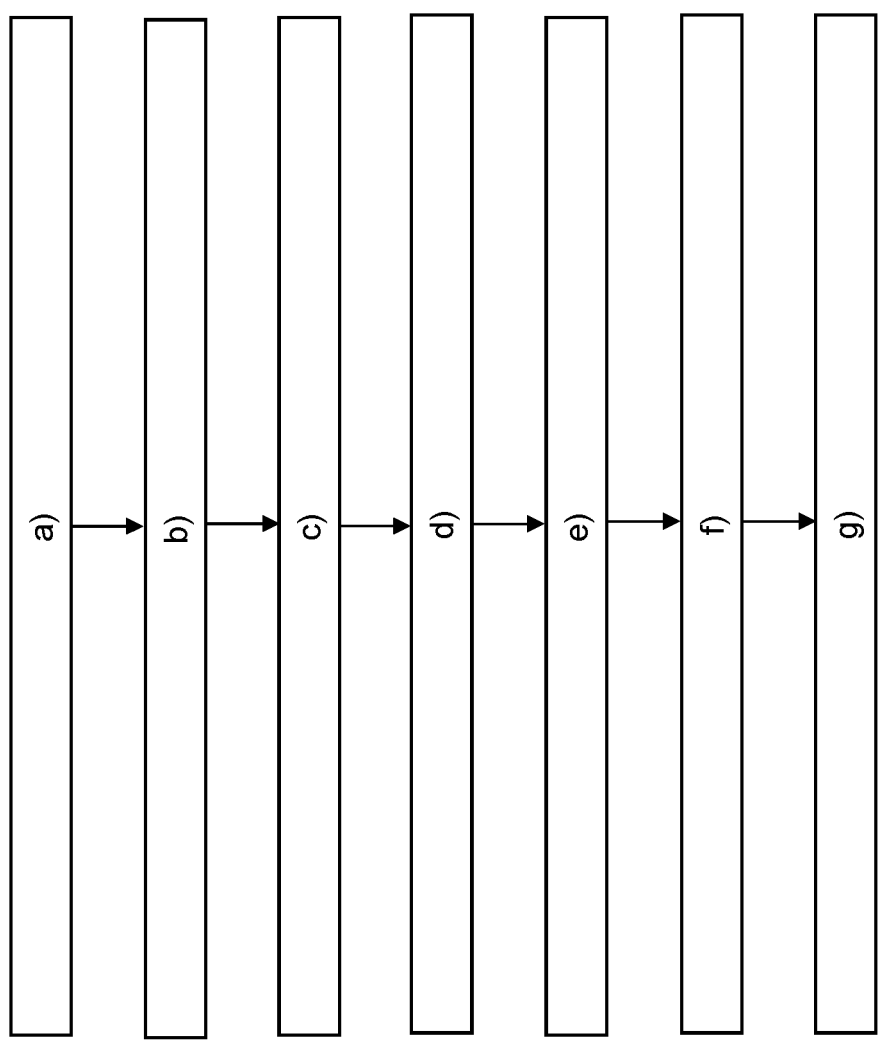

COMPOSITE PANE WITH AN ELECTRICAL LOAD

CROSS-REFERENCE TO RELATED APPLICATIONS

This application is the U.S. National Stage of PCT/EP2018/054055, filed Feb. 20, 2018, which in turn claims priority to European patent application number 17 161 056.1 filed Mar. 15, 2017. The content of these applications are incorporated herein by reference in their entireties.

The invention relates to a composite pane, a system for reproducing image data with such a composite pane, a method for producing the composite pane, and use of the composite pane in a motor vehicle.

Modern motor vehicles are increasingly equipped with additional functionalities. Also, for increasing traffic safety, motor vehicles are offered with driver assistance systems that give a driver important information about his current traffic situation. This also includes a camera- and display-based mirror replacement system that can present a larger image detail than a conventional rearview mirror. It is known to use a camera for recording images for monitoring a traffic space positioned behind the vehicle. The images are reproduced on a display placed in the region of the cockpit. Due to the limited space available, the display is also dimensioned correspondingly small.

Furthermore, windshields of vehicles that are used in this context are made of two glass panes that are laminated to one another via a thermoplastic film. Situated between the two glass panes are elements not integrated over the entire surface, such as LEDs or displays. The bonding of the two glass panes as well as the elements is done in a single lamination process. Such integrated elements can be arranged in the central, upper section of the windshield. A windshield thus equipped can have the problem that the elements, in particular LED-based displays, do not withstand the high temperatures and pressure demands during lamination. Even a reduction in temperature, residence time, or pressure does not result in the desired outcome because the optical properties of the composite pane are unacceptable in such cases. In particular, when the display is provided for reproducing image data, the optical properties of the display can deteriorate significantly after lamination. These manufacturing defects result in high reject rates since displays with poor optical properties cannot be used.

The object of the invention is to provide a composite pane having an electrical load that can be integrated into the composite pane and in which the optical properties of the load are significantly improved.

The object of the present invention is accomplished by a composite pane according to claim 1. Preferred embodiments are apparent from the dependent claims.

The composite pane according to the invention with an electrical load comprises an outer pane and an inner pane that are joined to one another via a thermoplastic intermediate layer, wherein
the thermoplastic intermediate layer has a recess that has a receiving opening,
the receiving opening is dimensioned such that it is designed for accommodating the electrical load in the recess, and
the electrical load is arranged in the recess.

Because of the fact that the electrical load can be inserted into the composite pane from the outside and is not exposed to the high temperature and pressure influences during lamination of the composite pane, good optical properties of the electrical load are retained in the composite pane. The electrical load remains optically clear and clearly perceptible. The electrical load can be arranged directly between the outer pane and the inner pane and can thus emit light particularly clearly for a vehicle driver.

The outer pane and the inner pane preferably have a constant thickness with substantially plane-parallel primary surfaces and a circumferential side edge connecting them. In a preferred embodiment, such a composite pane can have the receiving opening on a side edge such that the electrical load can be inserted into the composite pane from the outside in a simple manner. In the context of the invention, the term "inner pane" refers to the pane of the composite pane facing the interior (vehicle interior). "Outer pane" refers to the pane facing the external environment.

The electrical load can expediently be a display device, in particular a display, for displaying optical information. Such a display device can be an organic light-emitting diode (OLED), an inorganic light-emitting diode (LED), a TFT display, and/or an LCD screen. However, the use of a plurality of such displays is also an alternative.

In one embodiment, the recess is dimensioned such that it can accommodate the electrical load in a flush manner.

In another embodiment, a display is arranged in the recess as an electrical load such that no connection is provided between the electrical load and the intermediate layer. Here, the recess can have as a holding device a frame in which the electrical load is mounted. In addition, the frame can have a latching device for locking the electrical load. The latching device can be arranged on the receiving opening.

Preferably, the receiving opening can be slit-shaped. The slit-shaped receiving opening is dimensioned such that a display can be introduced into the recess via the receiving opening.

In these embodiments, the electrical load can receive data, in particular image data, via a connection element and/or be connected to a power supply. The connection element extends outward out of the receiving opening. The connection element can be implemented as a flexible foil conductor (flat conductor, ribbon conductor). A foil conductor is, for example, a strip or a band containing or made of copper, tinned copper, aluminum, silver, gold, or alloys thereof. The foil conductor has, for example, a width of 2 mm to 16 mm and a thickness of 0.03 mm to 0.1 mm. The foil conductor can have an insulating, preferably polymeric sheath, for example, polyimide based. Alternatively, thin metal wires can also be used as an electrical connection.

In another embodiment, the electrical load is connected to a network via a data bus system. The data bus system can be a CAN, LIN, MOST system. The network can further include a camera for capturing image data of an environment of the camera. For this purpose, the camera can be mounted on a vehicle and be a component of a driver assistance system. This saves additional outfitting of the vehicle with energy and space consuming components. The camera can be arranged in the rear region of the vehicle.

The electrical load has, in an advantageous embodiment, a wireless interface for data transmission that processes data according to a Bluetooth, NFC, Zigbee, WLAN (IEEE 802.11, Wi-Fi), or DECT standard.

In another preferred embodiment, the recess and the electrical load are arranged in the central upper section of the composite pane. Alternatively, or additionally, the electrical load can be arranged on a lower edge of the composite pane.

The thermoplastic intermediate layer is preferably transparent. The intermediate layer preferably contains at least one plastic, preferably polyvinyl butyral (PVB), ethylene vinyl acetate (EVA), and/or polyethylene terephthalate (PET). The intermediate layer can, however, also contain, for example, polyurethane (PU), polypropylene (PP), polyacrylate, polyethylene (PE), polycarbonate (PC), polymethyl methacrylate, polyvinyl chloride, polyacetate resin, casting resins, acrylates, fluorinated ethylenepropylene, polyvinyl fluoride, and/or ethylene-tetrafluoroethylene, or copolymers or mixtures thereof. The intermediate layer can be one or even a plurality of films arranged one atop another, wherein the thickness of one film is preferably from 0.025 mm to 1 mm, typically 0.38 mm or 0.84 mm. The intermediate layer can preferably be thermoplastic and, after lamination, adhesively bond the inner pane, the outer pane, and possible other intermediate layers to one another. In the context of the invention, the lamination is thus the joining of the inner pane, the intermediate layer, and the outer pane.

The composite pane or the inner pane and the outer pane preferably contain glass, particularly preferably flat glass, float glass, quartz glass, borosilicate glass, soda lime glass, or clear plastics, preferably rigid clear plastics, in particular polyethylene, polypropylene, polycarbonate, polymethyl methacrylate, polystyrene, polyamide, polyesters, polyvinyl chloride, and/or mixtures thereof. The composite pane or the inner pane and the outer pane are preferably transparent, in particular for use of the pane as a windshield of a vehicle or other uses in which high light transmittance is desirable. In the context of the invention, "transparent" means a pane that has transmittance in the visible spectral range greater than 70%. For panes that are not positioned in the traffic-relevant field of vision of the driver, for example, for roof panels, the transmittance can however also be much lower, for example, greater than 5%.

The thickness of the inner pane is, in an advantageous embodiment, from 0.4 mm to 3.5 mm, preferably from 0.9 mm to 2.1 mm.

The thickness of the outer pane is, in an advantageous embodiment, at least 1.4 mm, preferably at least 1.6 mm. The thickness of the outer pane is preferably at most 4.5 mm, preferably at most 2.1 mm. In this range, the composite pane has advantageous mechanical stability and noise-shielding properties, but is nevertheless adequately thin and light to be able to be used as a windshield.

The outer pane, the inner pane, and the thermoplastic intermediate layer can be clear and colorless, but also tinted or colored. The total transmittance through the composite pane is, in a preferred embodiment, greater than 70%, in particular when the composite pane is a windshield. The term "total transmittance" is based on the process defined by ECE-R 43, Annex 3, § 9.1 for testing light permeability of motor vehicle windows. The outer pane can preferably have, on the inside in the region near the glass edge, a black print to conceal the recess with the electrical load.

The composite pane is preferably curved in one or a plurality of spatial directions, as is customary for motor vehicle windows, typical radii of curvature being in the range from approx. 10 cm to approx. 40 m. The composite pane can, however, also be flat, for example, when it is provided as a pane for buses, trains, or tractors.

The production of the composite pane by lamination is done with, for example, vacuum bag methods, vacuum ring methods, calender methods, vacuum laminators, autoclave methods, or combinations thereof. The bonding of the outer pane and the inner pane is customarily done under the action of heat, vacuum, and/or pressure.

The composite pane is suitable for separating a vehicle interior from an external environment. The composite pane can be used in many ways. It can, for example, be a windshield, a roof panel, a rear window, a side window, or another glazing delimiting the vehicle interior.

In a preferred embodiment, the outer pane and inner pane are not prestressed. Nevertheless, during lamination of the panes, a characteristic distribution of tensile and compressive stresses develops, which the person skilled in the art can, however, distinguish without difficulty from stresses that are intentionally produced by the use of prestressed panes.

Another aspect of the invention includes a system for reproducing image data, characterized in that a camera is provided for recording images of the surroundings of the vehicle and a composite pane is provided with a display for displaying the recorded images. The system first records an image via the camera and then reproduces the image via the display arranged in the composite pane.

For better recognizability, it is expedient for the camera to be a CCD camera. Alternatively, or additionally, the camera can be a radar or an infrared camera.

The system according to the invention for reproducing image data offers, instead of a conventional rearview mirror, a clear reproduction of the images captured by the camera such that a conventional space-consuming rearview mirror on the windshield can be dispensed with.

In this connection, it is particularly expedient to provide the display at the location where the rearview mirror of the vehicle is customarily arranged. Optionally, the display can have rear blackening.

The invention also includes a method for producing a composite pane with an electrical load, wherein
   a) a thermoplastic intermediate layer is provided,
   b) a recess is cut out in the edge region of the thermoplastic intermediate layer, wherein the shape of the recess is at least adapted to the basic shape of the electrical load,
   c) the thermoplastic intermediate layer flat lies flat on an inner pane or an outer pane,
   d) a placeholder is inserted into the recess,
   e) the outer pane or the inner pane is placed on the thermoplastic intermediate layer,
   f) a layer stack comprising
      inner pane,
      thermoplastic intermediate layer with the placeholder, and
      outer pane
      is laminated to form a composite pane, and
   g) the electrical load is inserted into the recess.

The production of the composite glass by lamination is done with conventional methods known per se to the person skilled in the art, for example, autoclave methods, vacuum bag methods, vacuum ring methods, calender methods, vacuum laminators, or combinations thereof. The bonding of the outer pane and the inner pane is customarily done under the action of heat, vacuum, and/or pressure. The so-called "autoclave method" is carried out at an increased pressure of approx. 10 bar to 15 bar and temperatures of 130° C. to 145° C. over approx. 2 hours.

Through the use of a placeholder during lamination, it is possible, in a simple manner, to produce a recess in the composite pane during lamination that is designed to accommodate an electrical load. Since the electrical load is not exposed to lamination, it is not adversely affected by the high temperatures and pressure during lamination. In addition, cutting back of the intermediate layer can be done simply and quickly after lamination and before insertion of the electrical load, without having to take into account connection elements that are hanging out. The cutting out in step b) and the cutting back of the intermediate layer after lamination is preferably done perpendicular to the surface of the intermediate layer.

The placeholder can, in particular, be implemented as a plate that is flat and has the same thickness everywhere. The plate is distinguished by its flat surface surface extending on two opposite sides, wherein the plate can be made of a solid material (e.g., paper, wood, metal, stone). After the placeholder has been inserted into the recess in step e), it can protrude laterally over the edge of the inner pane or the outer pane. This enables formation of a gripping surface where the placeholder can be removed after lamination in step f) from the composite pane. Advantageously, in this embodiment, the placeholder has, at least partially, a non-adhesive coating, made in particular of polytetrafluoroethylene. The polytetrafluoroethylene, abbreviation PTFE, also polytetrafluoroethene, is an unbranched, linear-structured, partially crystalline polymer of fluorine and carbon and also known as "Teflon", polytetrafluoroethene, or XYNFLON. The polytetrafluoroethylene thus enables simple detachment of the placeholder from the intermediate layer of the composite pane.

After the insertion of the electrical load into the recess, the recess can then be gas-tightly sealed with a sealant, while a connection element of the electrical load is guided to the outside. Bytol can be used as the sealant. It is also possible, for protecting the electrical load from outside influences, e.g., moisture and dirt, to carry out a subsequent, temporally limited lamination at low temperatures in order to seal the recess.

Optionally, the placeholder can be implemented as a holding device that frames the recess between the inner pane and the outer pane. In this case, the electrical load is inserted into the holding device after lamination in step f). In such an embodiment, the holding device can be implemented as a frame that is arranged on the inner pane or the outer pane in step d) of the method according to the invention. The frame delimits the recess relative to the intermediate layer. In addition, the holding device can have mechanically acting means for securing the electrical load, wherein the securing means permit nondestructive removal of the electrical load. Furthermore, the holding device can have a receiving opening that is surrounded on all sides by the holding device. Such a holding device can have a plastic and/or metal construction, in particular thermosetting plastic.

The invention also includes the use of a composite pane according to the invention in a motor vehicle, preferably a passenger car, as a windshield or side window.

Of course, the characteristics mentioned above and explained in detail in the following can be used not only in the combinations and configurations indicated, but also in other combinations and configurations or in isolation without departing from the scope of the present invention.

In the following, the invention is explained in detail with reference to drawings and exemplary embodiments. The drawings are a schematic representation and not true to scale. The drawings in no way restrict the invention.

Figure 2:
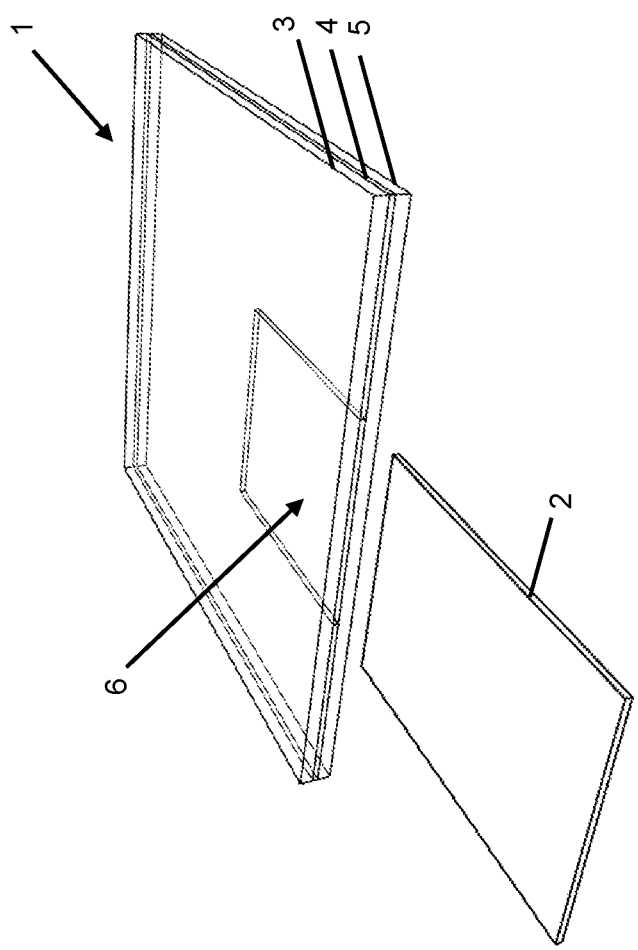
Figure 3:
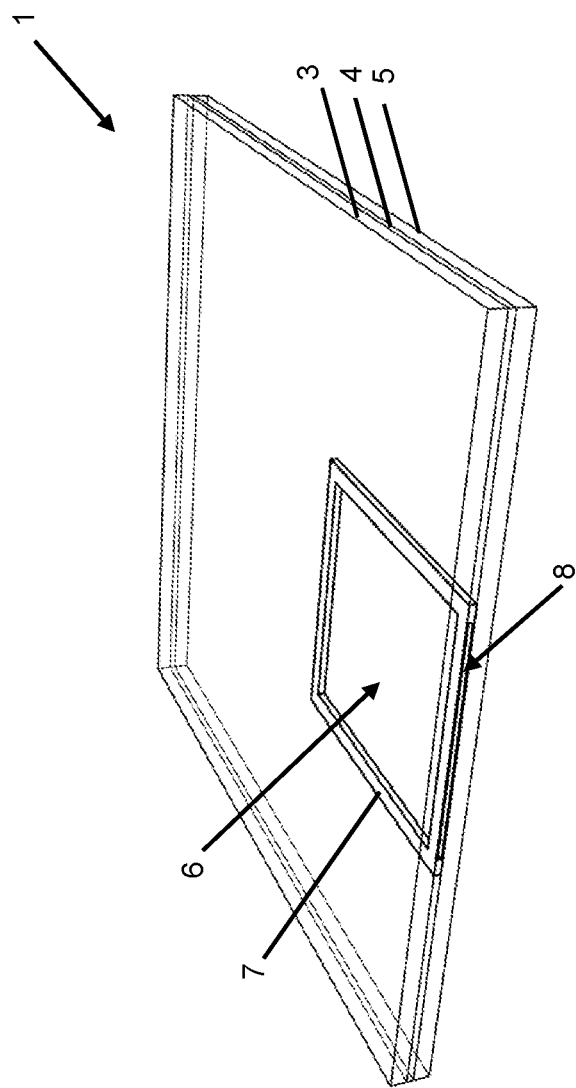
Figure 4:
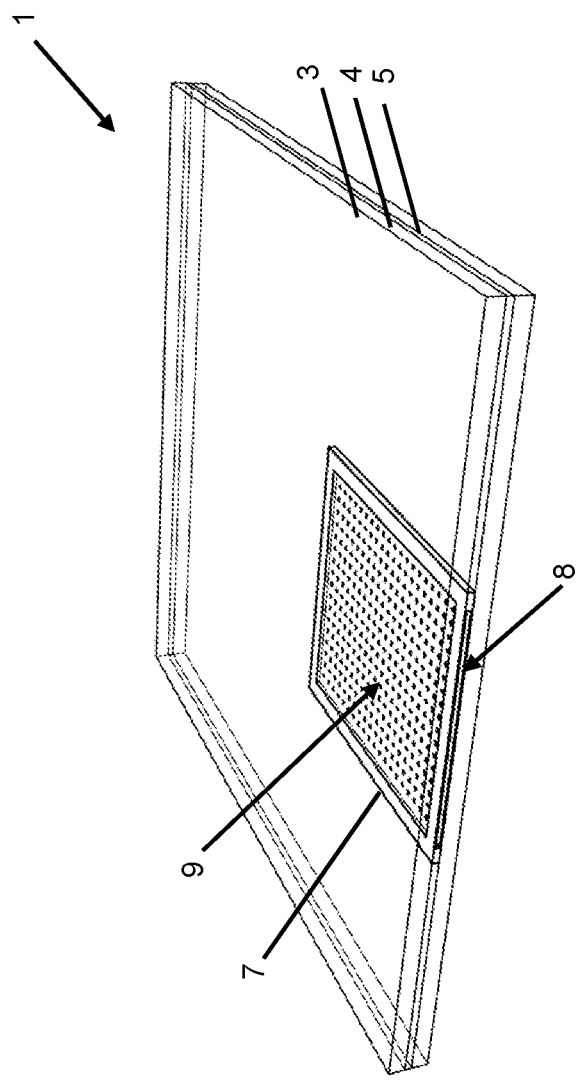
Figure 5:
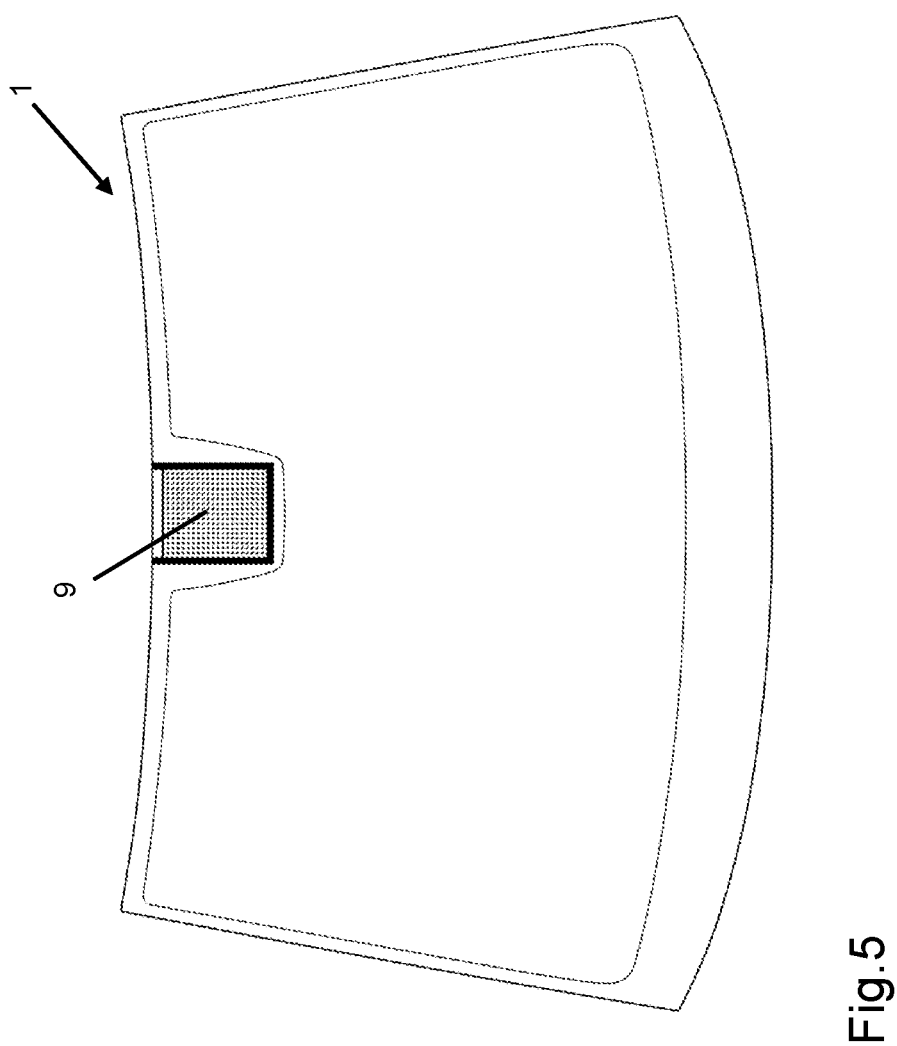
Figure 6:
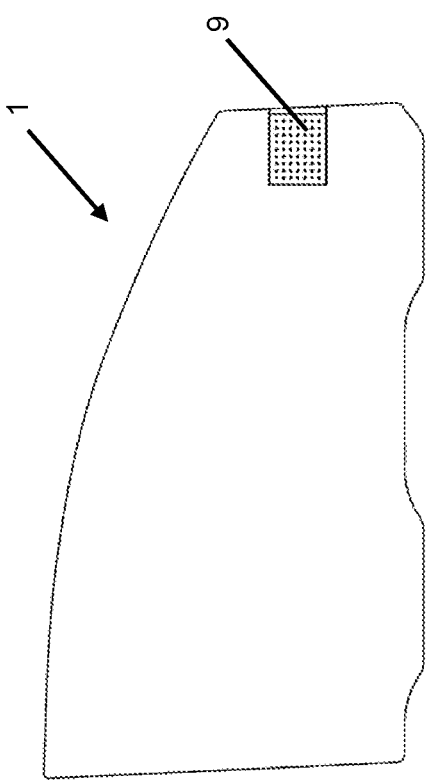

They depict:

FIG. 1 a representation of an embodiment of a composite pane according to the invention having a placeholder, before lamination, FIG. 2 a plan view of an embodiment of a composite pane according to the invention after removal of the placeholder, FIG. 3 a plan view of another embodiment of a composite pane according to the invention with a placeholder implemented as a frame, FIG. 4 a plan view of an embodiment of the placeholder implemented as a frame with a display, FIG. 5 a plan view of an embodiment of a composite pane according to the invention as a windshield, FIG. 6 a plan view of another embodiment of a composite pane edge according to the invention as a side window, FIG. 7 a flowchart of an exemplary embodiment of the method according to the invention for producing a composite pane.

FIG. 1 depicts a composite pane 1 with a placeholder 2 before lamination of the composite pane 1. The composite pane 1 consists of an outer pane 3 made of soda lime glass with a thickness of 2.1 mm, an intermediate layer 4, and an inner pane 5 made of soda lime glass with a thickness of 2.1 mm.

The intermediate layer 4 is a single film made of PVB and has a recess 6 in the edge region. The shape of the recess 6 corresponds to the basic shape of an electrical load that is inserted into the recess 6 after lamination of the composite pane 1. The placeholder 2 is arranged in the recess 6 before lamination.

In the example depicted, the placeholder 2 is implemented in the form of a paper sheet. Its thickness corresponds to the thickness of the intermediate layer 4 such that it is embedded in the intermediate layer 4. The placeholder 2 is dimensioned such that it protrudes out of the recess beyond the edge of the inner pane 5. The recess 6 is adapted to the shape of the placeholder section that protrudes into the composite pane 1. In addition, the placeholder 2 has a coating made of polytetrafluoroethylene. The placeholder 2 is thus clamped in a planar manner between the inner pane 5 and the outer pane 3 in the region of the intermediate layer 4.

This arrangement has proven to be quite useful since the intermediate layer 4 serving to bond the inner pane 5 and the outer pane 3 encloses the placeholder 2 quite well.

FIG. 2 depicts a plan view of an exemplary embodiment of the composite pane 1 of FIG. 1, after lamination. The lamination of the composite pane 1 with the placeholder 2 is carried out in a pressure- and temperature-resistant device. During lamination, the liquefied intermediate layer 4 is delimited in the region of the placeholder 2. Thus, the shape of the recess 6 is retained. After lamination, the placeholder 2 is removed from the recess 6.

If the composite pane 1 with an electrical load instead of the placeholder 2 were exposed during lamination to elevated thermal stresses and pressure, this could result in deformation or destruction of the electrical load. The use of the placeholder 2 provided with a non-adhesive coating has proven to be ideal since the placeholder 2 is detached again from the intermediate layer 4 in a simple manner and can be removed again from the composite pane 1.

FIG. 3 depicts a plan view of another embodiment of a composite pane 1 according to the invention. In the example depicted, the placeholder 2 is implemented as a holding device 7 that frames the recess 6 between the inner pane 5 and the outer pane 3. The frame-shaped holding device 7 has a slit-shaped receiving opening 8 on one side that is provided for accommodating a display. The frame-shaped holding device 7 consists of a metal/plastic construction.

During lamination, the frame-shaped holding device 7 delimits the recess relative to the intermediate layer 4. After lamination, the frame-shaped holding device 7 remains in the composite pane 1.

An OLED display is inserted into the frame-shaped holding device 7 via the slit-shaped receiving opening 8. The holding device 7 also has a plurality of clamps that secure the display as mechanically acting means. When necessary, the clamps permit nondestructive removal of the display.

FIG. 4 depicts a plan view of the frame-shaped holding device 7 of FIG. 3. The display 9 is arranged in the frame-shaped holding device 7.

FIG. 5 depicts a plan view of an embodiment of a composite pane 1 according to the invention as a windshield of a motor vehicle. The display 9 can be an OLED display that is arranged in the central, upper section of the composite pane 1. In the example depicted, the display 9 is a component of a system for reproducing image data that is provided as a replacement for a rearview mirror assembly in the vehicle. A vehicle driver can view the traffic area to the rear using the display 9 via a camera display.

Alternatively, or additionally, such a display 9 can be used for presenting the status information of a traffic light. The outer pane 3 preferably has a black print on the inside in the region near the edge of the glass to conceal the display 9.

FIG. 6 depicts a plan view of another embodiment of a composite pane 1 according to the invention as a side window of a motor vehicle. In the example depicted, the display 9 is installed in a front side window of the vehicle.

FIG. 7 depicts a flowchart of an exemplary embodiment of the method according to the invention for producing a composite pane 1 with an OLED display 9. The production is done in a horizontal state, wherein
 a) a thermoplastic intermediate layer is prepared,
 b) a recess 6 is cut out in the edge region of the thermoplastic intermediate layer 4, wherein the shape of the recess corresponds to the basic shape of the OLED display 9,
 c) the thermoplastic intermediate layer 4 lies flat on the inner pane 5,
 d) a placeholder 2 is inserted into the recess 6,
 e) the outer pane 3 is placed on the thermoplastic intermediate layer 4,
 f) a layer stack comprising
  inner pane 5,
  thermoplastic intermediate layer 4 with a placeholder 2, and
  outer pane 3
  is laminated to form a composite pane 1, and
 g) the OLED display 9 is inserted into the recess 6.

The production of the composite glass by lamination is done in the autoclave method. The bonding of the outer pane 3 and the inner pane 5 is done at an elevated pressure of approx. 10 bar to 15 bar and temperatures of 130° C. to 145° C. over approx. 2 hours.

Through the use of the placeholder 2 during lamination, the shape of the recess 6 that is provided for receiving the OLED display 9 can be retained. Since the OLED display 9 is not exposed to lamination, it cannot be adversely affected by high temperatures and pressure.

In this example, the placeholder 2 is implemented as a plate that is flat and is the same thickness everywhere. After the placeholder has been inserted in the recess 6 in step e), it can protrude laterally beyond the edge of the inner pane 5. This enables the formation of a gripping surface on which the placeholder 2 can be removed from the composite pane 1 after lamination in step f). Advantageously, the placeholder has, in this embodiment, a non-adhesive coating that enables detachment of the placeholder 2 from the intermediate layer 4.

After insertion of the OLED display 9 into the recess 6, the opening of the recess 6 is gas-tightly sealed with a sealant. The OLED display 9 has a connection element that connects the OLED display 9 to a power supply and to a data network. The connection element of the OLED display 9 protrudes beyond the sealant outside the composite pane 1. Bytol is used as the sealant.

Alternatively, the recess 6 along with the OLED display 9 can be sealed in the composite pane 1 by means of subsequent, temporally limited lamination at low temperatures. A PVB used here has a thickness from 50 μm to 0.38 mm.

Optionally, the placeholder 2 can be implemented as a holding device 7, as depicted in FIGS. 3 and 4, that frames the recess 6 between the inner pane and the outer pane 3. Here, the OLED display 9 is inserted into the holding device 7 after lamination in step f). In such an embodiment, the holding device 7 is implemented as a frame that is arranged on the inner pane in step d) of the production method. Thus, the frame delimits the recess 6 relative to the intermediate layer 4. In addition, the holding device 7 can have two clamps that secure the OLED display 9 in the frame. The frame has a receiving opening 8, via which the OLED display 6 is inserted into the recess 6.

LIST OF REFERENCE CHARACTERS 1 composite pane
2 placeholder
3 outer pane
4 intermediate layer
5 inner pane
6 recess
7 holding device
8 receiving opening
9 display

The invention claimed is:

1. Composite pane with an electrical load, comprising an outer pane and an inner pane that are joined to one another via a thermoplastic intermediate layer, wherein
 the thermoplastic intermediate layer has a recess that has a receiving opening,
 the receiving opening is dimensioned such that the receiving opening is designed for accommodating the electrical load in the recess,
 the electrical load is arranged directly between the outer pane and the inner pane in the recess so that the thermoplastic intermediate layer is absent between the electrical load and the outer pane and between the electrical load and the inner pane, and
 the recess has a holding device implemented as a frame in which the electrical load is mounted, the frame being arranged in the recess,
 wherein the frame has a slit for removably receiving the electrical load in the recess.

2. The composite pane according to claim 1, wherein the electrical load has a display device.

3. The composite pane according to claim 1, wherein the recess is dimensioned such that the recess can accommodate the electrical load in a flush manner.

4. The composite pane according to claim 1, wherein no connection is provided between the electrical load and the intermediate layer.

5. The composite pane according to claim 1, wherein the receiving opening is slit-shaped.

6. The composite pane according to claim 1, wherein a connection element of the electrical load extends outward out of the receiving opening.

7. The composite pane according to claim 2, wherein the display device is a display for displaying optical information.

8. The composite pane according to claim 1, wherein the frame has a thickness that is equal to a thickness of the thermoplastic intermediate layer.

9. A method comprising utilizing a composite pane according to claim 1 in a motor vehicle as a windshield or side window.

10. System for reproducing image data, comprising a camera for recording images of the surroundings of a vehicle and a composite pane provided with an electrical load that has a display device for displaying the recorded images, the composite pane comprising an outer pane and an inner pane that are joined to one another via a thermoplastic intermediate layer, wherein the thermoplastic intermediate layer has a recess that has a receiving opening, the receiving opening is dimensioned such that the receiving opening is designed for accommodating the electrical load in the recess, the electrical load is arranged directly between the outer pane and the inner pane in the recess so that the thermoplastic intermediate layer is absent between the electrical load and the outer pane and between the electrical load and the inner pane, and the recess has a holding device implemented as a frame in which the electrical load is mounted, the frame being arranged in the recess, wherein the frame has a slit for removably receiving the electrical load in the recess.

11. Method for producing a composite pane with an electrical load, the composite pane comprising an outer pane and an inner pane that are joined to one another via a thermoplastic intermediate layer, the thermoplastic intermediate layer having a recess that has a receiving opening, the receiving opening being dimensioned such that the receiving opening is designed for accommodating the electrical load in the recess, the electrical load being arranged directly between the outer pane and the inner pane in the recess so that the thermoplastic intermediate layer is absent between the electrical load and the outer pane and between the electrical load and the inner pane, the recess having a holding device implemented as a frame in which the electrical load is mounted, the frame being arranged in the recess, and the frame having a slit for removably receiving the electrical load in the recess, the method comprising:

a) providing the thermoplastic intermediate layer, b) cutting out the recess in an edge region of the thermoplastic intermediate layer, wherein a shape of the recess is adapted to a basic shape of the electrical load, c) lying the thermoplastic intermediate layer flat on the inner pane or the outer pane, d) inserting a placeholder into the recess, e) placing the outer pane or the inner pane on the thermoplastic intermediate layer, f) laminating a layer stack comprising
inner pane,
thermoplastic intermediate layer with the placeholder, and
outer pane
to form the composite pane, and g) inserting the electrical load into the recess.

12. The method according to claim 11, wherein the placeholder is removed from the composite pane.

13. The method according to claim 11, wherein the placeholder has, at least partially, a non-adhesive coating.

14. The method according to claim 11, wherein the placeholder is implemented as the holding device that frames the recess between the inner pane and the outer pane and the electrical load is inserted in the holding device.

15. The method according to claim 14, wherein the holding device has a receiving opening.

16. The method according to claim 14, wherein the holding device has a plastic and/or metal construction.

17. The method according to claim 13, wherein the non-adhesive coating is polytetrafluoroethylene.

18. The method according to claim 9, wherein the motor vehicle is a passenger car.

* * * * *